(12) United States Patent
Parks

(10) Patent No.: US 12,366,315 B2
(45) Date of Patent: Jul. 22, 2025

(54) QUICK CONNECTOR WITH SEAL RETENTION BY FLOATING RETAINING RING

(71) Applicant: A. RAYMOND ET CIE, Grenoble (FR)

(72) Inventor: Brian Parks, Fenton, MI (US)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/710,516

(22) PCT Filed: Nov. 19, 2021

(86) PCT No.: PCT/IB2021/060758
§ 371 (c)(1),
(2) Date: May 15, 2024

(87) PCT Pub. No.: WO2023/089367
PCT Pub. Date: May 25, 2023

(65) Prior Publication Data
US 2025/0003540 A1    Jan. 2, 2025

(51) Int. Cl.
*F16L 37/14*    (2006.01)
(52) U.S. Cl.
CPC .................................. *F16L 37/144* (2013.01)
(58) Field of Classification Search
CPC ... F16L 37/142; F16L 37/144; F16L 37/1225; F16L 37/12; F16L 37/0841; F16L 37/088; F16L 37/0885
See application file for complete search history.

(56) References Cited

U.S. PATENT DOCUMENTS

| | | | |
|---|---|---|---|
| 6,293,596 B1 | 9/2001 | Kinder | |
| 10,458,583 B2* | 10/2019 | Parks | F16L 37/144 |
| 2013/0307263 A1* | 11/2013 | Parks | F16L 37/144 |
| | | | 285/319 |
| 2014/0001752 A1* | 1/2014 | Parks | F16L 37/133 |
| | | | 285/319 |
| 2015/0167879 A1* | 6/2015 | Chaupin | F16L 37/1225 |
| | | | 285/321 |
| 2017/0059072 A1* | 3/2017 | Parks | F16L 37/144 |

FOREIGN PATENT DOCUMENTS

WO    2012154298 A1    11/2012

* cited by examiner

*Primary Examiner* — Aaron M Dunwoody
(74) *Attorney, Agent, or Firm* — WARNER NORCROSS + JUDD LLP

(57) ABSTRACT

A quick connector assembly for mating with a male end form includes a housing having an inner bore for receiving the male end form. The inner bore includes first and second sections. A locker slidably engages the exterior surface of the housing and is movable between unlocked and locked positions. A seal pack including a first sealing ring, a second sealing ring, and a spacer sandwiched between the first and second sealing rings is disposed in the first section. A floating retaining ring is partially disposed within the second section. The retaining ring includes an elongated boss that extends axially into the first section and abuts the first sealing ring for retaining the seal pack in the first section. In the unlocked position, the elongated boss of the retaining ring prevents the first sealing ring from being displaced out of the first section of the inner bore.

18 Claims, 5 Drawing Sheets

QUICK CONNECTOR WITH SEAL RETENTION BY FLOATING RETAINING RING

FIELD OF THE INVENTION

The disclosure generally relates to quick connectors, and more specifically, to quick connectors which receive and lock with a male end form.

BACKGROUND OF THE INVENTION

Quick connectors are connector assemblies that are used in many different applications for conveniently and quickly connecting and establishing fluid communication between a male end form and a hose, pipe, tube, or similar components. In the automotive industry, quick connectors are often used for fuel lines, and failure of the quick connector could pose a serious safety risk. Quick connectors are also commonly used in the automotive industry to connect tubing used in engine cooling circuits or, more recently, in cooling circuits used to cool batteries of electric or hybrid vehicles. It is important that the male end form can quickly engage with the quick connector to minimize assembly time and labor, e.g. on an assembly line. At the same time, the quick connector must be very reliable and must establish a fluid-tight seal with the male end form which will not leak or otherwise disengage from the male end form. To mitigate this risk, manufacturers have developed assemblies that cannot be latched down until the male end form is completely inserted into the quick connector.

One known type of quick connector assembly includes a housing having a female receiving portion for receiving a male end form and a stem portion for receiving a hose. A locker is movable between a non-engaged position for allowing insertion or withdrawal of the male end form and an engaged position for engaging the bead to retain the male end form in the housing. The locker includes a ring that prevents the locker from moving to the engaged position until the male end form is inserted into the housing by a predetermined distance, whereupon the ring breaks to allow the male end form to be fully inserted into the housing. Once the male end form is fully inserted into the housing and the bead passes the locker, the locker may be moved downwardly into the engaged position to engage the bead and hold the male end form in a locked position within the housing. The locker may then be moved back to the non-engaged position for allowing withdrawal of the male end form. However, once the male end form is removed from the quick connector assembly, because the ring has been broken, there is nothing to prevent the locker from moving back into the engaged position, even when the male end form is not disposed in the housing. Thus, this type of quick connector assembly only prevents the locker from moving to the engaged position until the quick connector assembly first receives a male end form. Thereafter, there is no safety mechanism for preventing the locker from moving to the engaged position, even when the male end form is not inserted into the housing of the quick connector assembly. A user could accidentally move the locker to the engaged position without the male end form being properly locked within the housing.

Further, this type of quick connector assembly may include a seal pack within the inner bore of the female receiving end, the seal pack including two O-rings separated by a spacer. Particularly, the inner bore of the female receiving end is stepped and has a wider diameter portion adjacent an inlet of the female receiving end, and a narrower diameter portion adjacent the wider diameter portion and in which the O-rings are disposed. The O-rings engage the male end form that is inserted into the female receiving end of the assembly. The assembly also includes a retaining ring that is intended to retain the seal pack in the narrower diameter portion of the inner bore. The retaining ring is held in position by a wave spring, which in turn is held in position by a plunger. When the quick connector assembly is used as intended and the male end form is inserted into and attached to the assembly, the plunger is shifted toward the retaining ring and the wave spring is compressed. The locker of the assembly is then moved from an unlocked position to a locked position. When the quick connector assembly is in the locked state, the plunger prevents the retaining ring from moving when pressure forces the seal pack against the retaining ring. In some cases, however, the quick connector assembly, and the fluid system in which it is connected, is pressurized while the assembly is in the unlocked state. For example, this is typically the case when the leak tightness of the system is tested. The pressure can be substantial enough to force the O-rings against the retaining ring, and subsequently force the retaining ring against the wave spring, causing the wave spring to compress. In some instances, compression of the wave spring can disadvantageously cause the O-ring adjacent to the retaining ring to be displaced out of its design position in the narrower diameter portion of the inner bore and into the wider diameter portion.

BRIEF SUMMARY

An improved quick connector (QC) assembly for mating with a male end form is provided. The QC assembly includes a housing having an exterior surface and an inner bore for receiving the male end form. The inner bore includes a first shoulder opening up to a first section having a first diameter, and a second shoulder opening up to a second section having a second diameter larger than the first diameter. A locker slidably engages the exterior surface of the housing. The locker is movable between an unlocked position for allowing the male end form to be inserted into and withdrawn from the inner bore and a locked position for trapping the male end form in the inner bore. A seal pack including a first sealing ring, a second sealing ring, and a spacer sandwiched between the first and second sealing rings is disposed in the first section of the inner bore. A floating retaining ring is partially disposed within the second section of the inner bore. The retaining ring includes a radially extending seat and an elongated boss that extends axially from the seat and into the first section of the inner bore and abuts the first sealing ring for retaining the seal pack in the first section of the inner bore. In the unlocked position, the elongated boss of the retaining ring prevents the first sealing ring from being displaced out of the first section of the inner bore when the seal pack is deflected by fluid pressure in the quick connector assembly.

In specific embodiments, the retaining ring is slidable along the inner bore.

In specific embodiments, the quick connector assembly includes a plunger slidably disposed within the second section of the inner bore and a resilient member engaging the plunger and biasing the plunger in a first direction toward a resting position.

In particular embodiments, the plunger includes a spring seat, and the resilient member is disposed between and engages the spring seat of the plunger and the seat of the retaining ring.

In particular embodiments, the retaining ring floats between the plunger and the seal pack.

In particular embodiments, the plunger includes an inner bore having diameter larger than an outer diameter of the retaining ring, and a portion of the retaining ring is received in the inner bore of the plunger.

In particular embodiments, the locker is movable from the unlocked position to the locked position only in response to the male end form being inserted into the inner bore of the housing to slide the plunger away from the resting position.

In particular embodiments, the resilient member is a wave spring.

In particular embodiments, the plunger includes a limiter projecting from an outer surface of the plunger. The limiter terminates in a barbed end; and the housing includes a window into which the barbed end of the limiter extends. The barbed end contacts an edge of the window to restrict axial movement of the plunger in the inner bore.

In specific embodiments, the seat of the retaining ring extends outwardly along the second shoulder of the inner bore.

In specific embodiments, the boss has a length that is sufficient to prevent the seal pack from protruding out from the first section of the inner bore.

In specific embodiments, the locker has a pair of outside legs slidably engaging the exterior surface of the housing.

In particular embodiments, the exterior surface of the housing includes at least two windows, and the outside legs of the locker each include a notch for engaging the windows. The locker may be movable from the locked position to the unlocked position only in response to the outside legs being pulled away from one another to disengage the notches from the windows.

In specific embodiments, the housing is I-shaped, U-shaped, L-shaped, or T-shaped.

In particular embodiments, the housing, the retaining ring, and/or the plunger is independently monolithic in construction.

A method of mating a male end form with a quick connector assembly is also provided. The method includes inserting the male end form into the inner bore of the housing, moving the locker between the unlocked position to the locked position, and in the unlocked position, preventing the first sealing ring from being displaced out of the first section of the inner bore.

The method may further include slidably disposing a plunger within the second section of the inner bore, providing a resilient member that engages the plunger and biases the plunger in a first direction toward a resting position, and inserting the male end form into the inner bore of the housing to slide the plunger away from the resting position.

In specific embodiments, the resilient member urges the retaining ring into engagement with the seal pack, and the boss of the retaining ring has a length that prevents the seal pack from being displaced from the first section of the inner bore.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
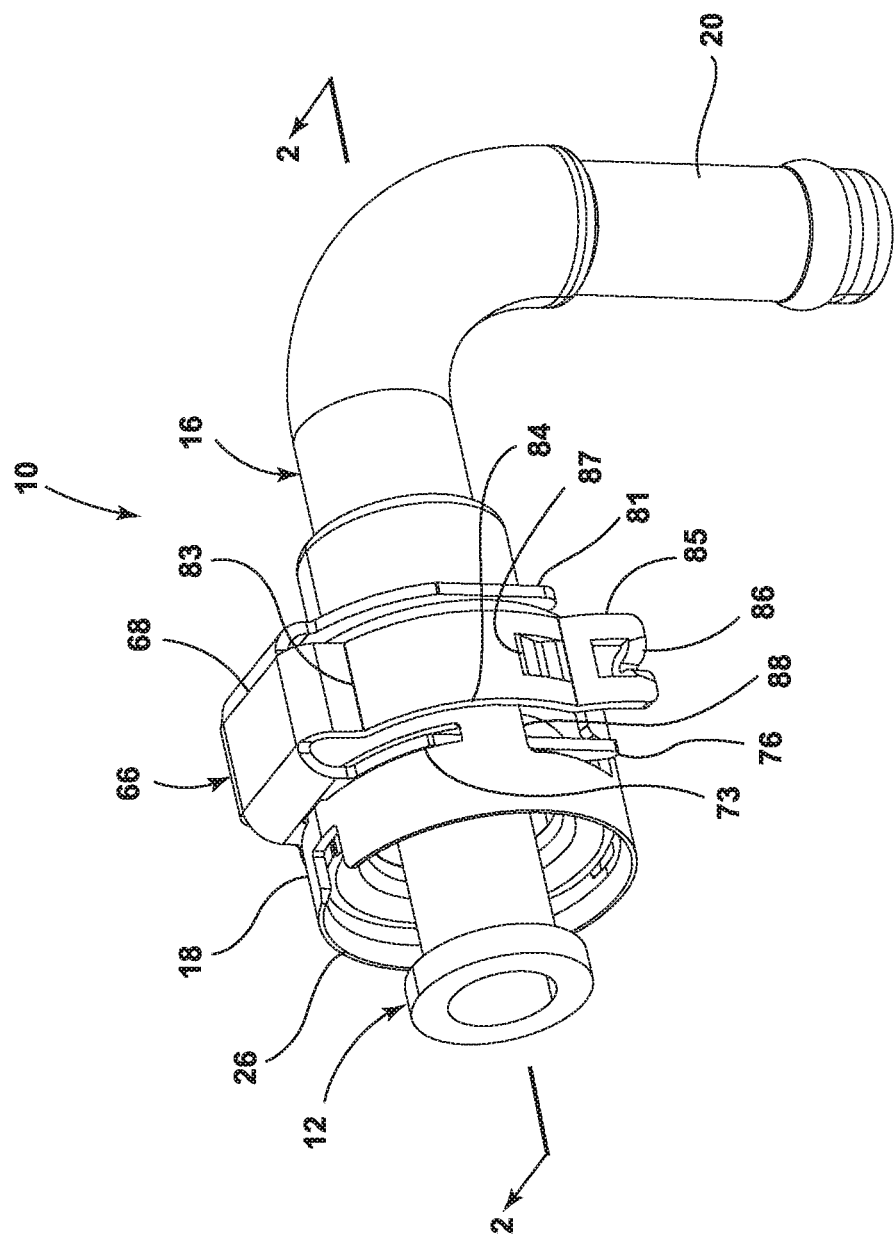
FIG. 1 shows a perspective view of a quick connector (QC) assembly in accordance with some embodiments of the disclosure.

Referring to the Figures, wherein like numerals indicate corresponding parts throughout the several views, a quick connector assembly 10 for establishing fluid communication between a male end form 12 and another hose or tube (not shown) is generally shown in FIGS. 1-6. The male end form 12 is preferably of metal, has a generally tubular shape with a bead 14 and extends forwardly of the bead 14 to a tube end. However, it should be appreciated that the male end form 12 could be of any desirable material and could have any desirable shape, and may not include a bead. Also, certain features of the quick connector assembly 10 are functional, but can be implemented in different aesthetic configurations.

The quick connector assembly 10 includes a housing 16 having a female receiving portion 18 for receiving the aforementioned male end form 12 and a stem portion 20 for receiving and establishing fluid communication with a hose or any other type of tube (not shown). In the embodiment shown, the housing 16 is formed of metal and is shaped through a deep drawing process. However, it should be appreciated that the housing 16 could be of any desirable type of formable material including, for example, polymeric materials or composites. The housing 16 could also be shaped through any desirable process, such as machining, injection molding, stamping, etc. As such, the housing 16 itself may conform to a variety of sizes, shapes or configurations, and may be I-shaped, U-shaped, L-shaped, T-shaped, or the like.

The housing 16 has an inner bore 22 which extends in an axial direction between the female receiving portion 18 and the stem portion 20 for conveying a fluid from the male end form 12 to the tube or hose (not shown) mating with the stem portion 20. The female receiving portion 18 presents an inlet orifice 26 for receiving the male end form 12 into the inner bore 22. The inner bore 22 of the female receiving portion 18 is twice-counterbored to present a first shoulder 28 opening up to a first section 30 having a first diameter and a second shoulder 32 opening up to a larger second section 34 having a second diameter which is larger than the first diameter. The stem portion 20 shown in the drawings extends through a right angle. However, it should be appreciated that the stem portion 20 could have a range of different shapes.

A seal pack 36 including a pair of first and second sealing rings 38, 40 and a spacer 42 is disposed in the first section 30 of the inner bore 22, with one of the sealing rings 40 abutting the first shoulder 28 and the spacer 42 sandwiched between the sealing rings 38, 40. The sealing rings 38, 40 are preferably O-rings which could be made of a variety of elastic materials depending on the fluid and operating temperatures of the quick connector assembly 10. The spacer 42 may be made of a thermoplastic material and is produced through an injection molding process; however, the spacer 42 could be of any desirable material and could be formed through any desirable process. It should also be appreciated that the first section 30 could include any number of sealing rings.

The quick connector assembly 10 further includes a generally cylindrically shaped, floating retaining ring 44 partially but mainly disposed in the second section 34 of the inner bore 22 and extending between the second shoulder 32 and the inlet orifice 26. The retaining ring 44 is slidable along the inner bore 22. A flange portion 45 of the retaining ring 44 extends radially outwardly along the second shoulder 32 of the housing to present a first spring seat 46 (discussed in further detail below). The retaining ring 44 also includes an elongated boss 48 that extends axially from the seat 46 into the first section 30 of the inner bore 22 to abut the first sealing ring 38 for retaining the seal pack 36 in the first section of the inner bore. As discussed in more detail below, the boss 48 has a length L that is sufficient to prevent the seal pack 36 from protruding out from the first section 30 of the inner bore 22. The retaining ring 44 may be formed of a thermoplastic material and may be produced through an injection molding process. However, it should be appreciated that the retaining ring 44 can be of any desirable material and could be produced using any desirable forming process.

The quick connector assembly 10 also includes a plunger 50 having a generally annular shape and slidably disposed within the second section 34 of the inner bore 22. The retaining ring 44 floats between the plunger 50 and the seal pack 36. The plunger 50 includes an inner bore having a front section 52 with a large diameter for receiving the bead 14 of the male end form 12 and a rear section 54 having a small diameter for receiving an end of the retaining ring 44 (the end of the retaining ring having an outer diameter smaller the inner diameter of the rear section of the plunger). The plunger 50 also has a second spring seat 56 which faces the above-discussed first spring seat 46 of the retaining ring 44. A resilient member 58 is disposed in the second section 34 of the inner bore 22 and extends between the first spring seat 46 of the retaining ring 44 and the second spring seat 56 of the plunger 50 for biasing the plunger toward the inlet orifice 26 and into a resting position. The resilient member 58 is thereby disposed between and engages the retaining ring 44 and the plunger 50. The resilient member 58 may be a wave spring formed of stainless steel stock material; however, it should be appreciated that any other type of compression spring could alternately be used. The plunger 50 also includes a limiter 60 projecting from an outer surface 61 of the plunger. The limiter 60 terminates in a barbed end 62. The housing 16 correspondingly includes a window 64 into which the barbed end 62 of the limiter 60 extends. The barbed end 62 contacts an edge of the window 64 to restrict axial movement of the plunger 50 in the inner bore 22. The plunger 50 is preferably of a thermoplastic material and is produced through an injection molding process. However, the plunger 50 could be of any desirable material and may be produced using any desirable forming method.

Figure 6:
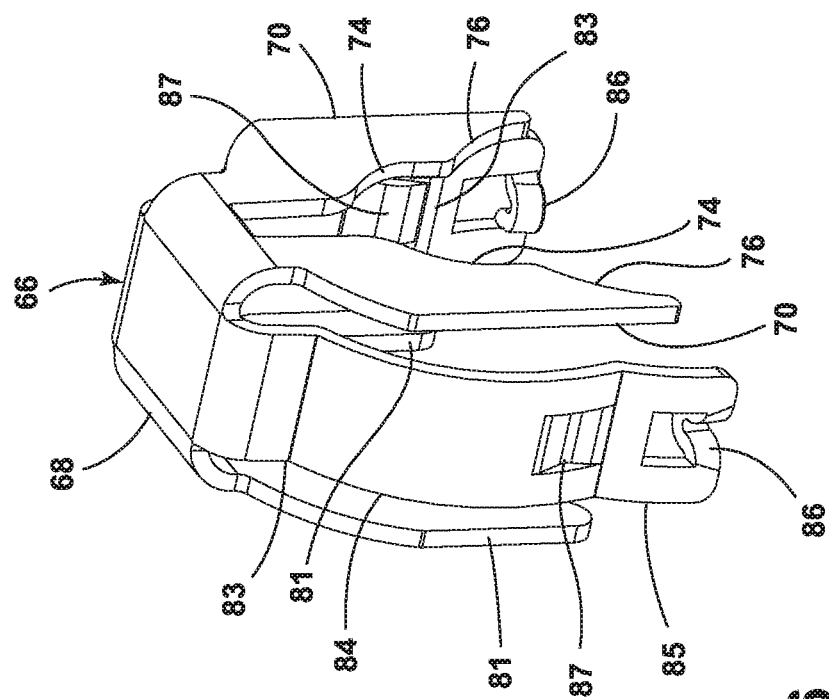
FIG. 6 shows a perspective view of a locker of the QC assembly in accordance with some embodiments of the disclosure.
Figure 5:
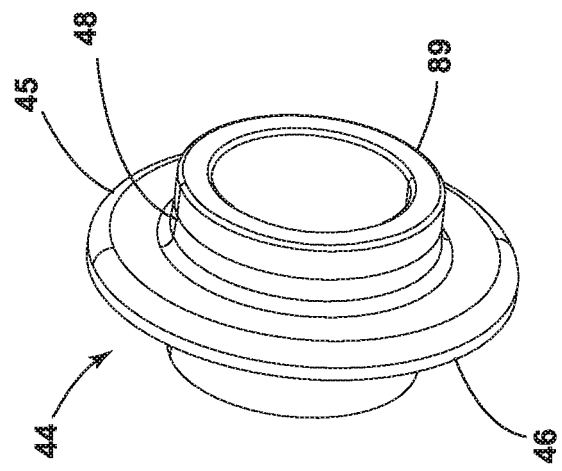
FIG. 5 shows a perspective view of a retaining ring of the QC assembly in accordance with some embodiments of the disclosure.

The quick connector assembly 10 also includes a locker 66 which is movable between a locked (engaged) position (FIGS. 2 and 4A) for retaining the male end form 12 in the housing 16 and an unlocked (non-engaged) position (FIG. 4B) for allowing the male end form to be inserted into or removed from the housing inner bore 22. The locker 66 includes a base 68 and a pair of inside legs 70 extending downwardly into the inner bore 22 through at least one upper gap 72 in the plunger 50 and gap 73 in the female receiving portion 18 of the housing 16. As best shown in FIG. 6, each of the inside legs 70 has an upper section 74 and a different lower section 76. The upper sections 74 are spaced from one another by a distance that is slightly greater than the diameter of the male end form 12, and the lower sections 76 are spaced by a distance that is greater than the diameter of the bead 14 of the male end form 12 but less than the diameter of the plunger 50. Thus, when the locker 66 is in the unlocked position shown in FIG. 4B, the resilient member 58 biases the plunger 50 against the lower sections 76 of the inside legs 70, and this position is hereinafter referred to as the "resting position." Because of the larger spacing of the lower sections 76 of the inside legs 70, when the locker 66 is in the unlocked position, the bead 14 of the male end form 12 may be inserted into the housing 16 past the inside legs 70 of the locker 66 to the position shown in FIGS. 2 and 4A. After the bead 14 clears the inside legs 70, the locker 66 can be moved downwardly into the locked position of FIGS. 2 and 4A. With the locker 66 in the locked position, the bead 14 of the male end form 12 is trapped between the upper sections 74 of the inside legs 70 and a shoulder 78 in the bore of the plunger 50. With that, the male end form 12 has successfully been locked and sealed within the quick connector assembly 10. Additionally, the plunger 50 is biased against the bead 14 of the male end form 12, and therefore, movement of the male end form relative to the housing 16 is restricted, even if the quick connector assembly 10 is vibrated, such as when a vehicle is travelling down a bumpy road. The plunger 50 may also have a flange 80 extending toward the retaining ring 44 for contacting the retaining ring when the male end form 12 is locked in the quick connector assembly 10, i.e. the flange 80 defines how far the plunger 50 can be pushed into the inner bore 22.

Figure 2:
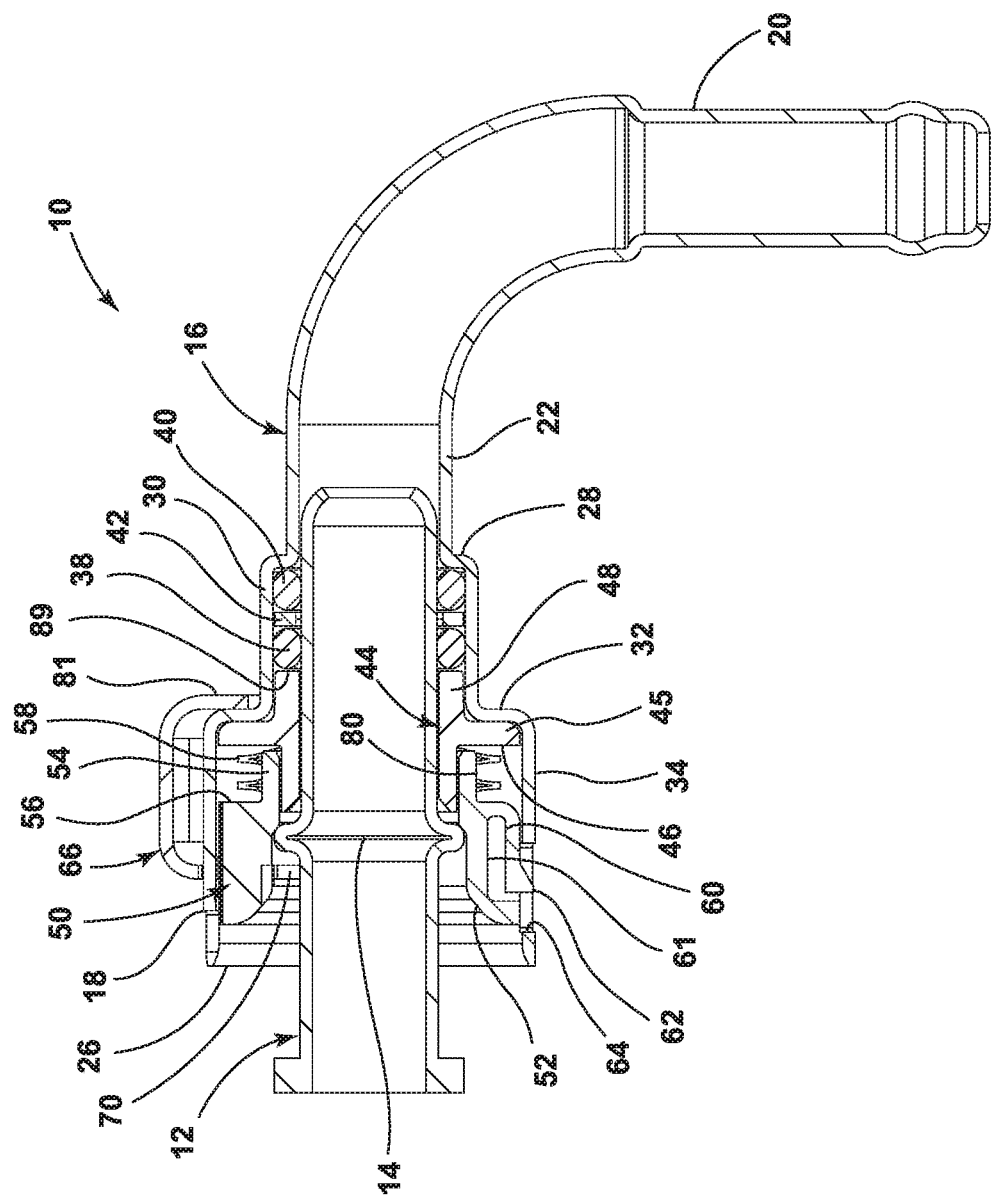
FIG. 2 shows a side cross-sectional view of the QC assembly taken along the line 2-2 in FIG. 1.

As shown in FIGS. 1 and 2, when the locker 66 is in the locked position, the lower sections 76 of the inside legs 70 extend downwardly through lower gaps in the plunger 50 and the housing 16 to provide evidence that the locker is in the locked position. This is advantageous because it provides a visual cue to a person, e.g. an assembly line worker or a mechanic, that the locker 66 has reached the locked position and the male end form 12 is properly locked and sealed with the quick connector assembly 10.

The locker 66 also includes a pair of rear legs 81 extending downwardly from the base 68 for engaging a rear side surface 82 on the exterior of the female receiving portion 18 of the housing 16. The rear legs 81 aid in positioning and securing the locker 66 about the housing. The locker 66 further includes a pair of outside legs 83 extending downwardly from the base 68 for engaging the exterior surface of the female receiving portion 18 of the housing 16. The outside legs 83 are spaced from one another and each has a first arc-shaped section 84 having the same curvature as the exterior surface of the housing 16, a second arc-shaped section 85 also having the same curvature as the exterior surface of the housing, and a flared section 86 flaring inwardly from the second arc-shaped section. When the locker 66 is installed onto the female receiving portion 18 of the housing 16 during assembly of the quick connector assembly 10, the locker is pushed downwardly from the position shown in FIG. 3 to flex the outside legs 83 outwardly until the second arc-shaped sections 85 engage the housing 16. At this point, the locker 66 is in the unlocked position shown in FIG. 4B. To move the locker 66 downwardly into the locked position of FIGS. 2 and 4A, a downward force must be applied to the base 68 to flex the outside legs 83 outwardly until the first arc-shaped sections 84 engage the housing 16. The shape of the outside legs 83 only allows the locker 66 to remain in either the unlocked position or the locked position, and thus, the locker cannot be moved into a partially-locked (partially-engaged) position from which the male end form 12 could accidentally detach from the quick connector assembly 10. This is yet another safety feature of the quick connector assembly 10.

Figure 3:
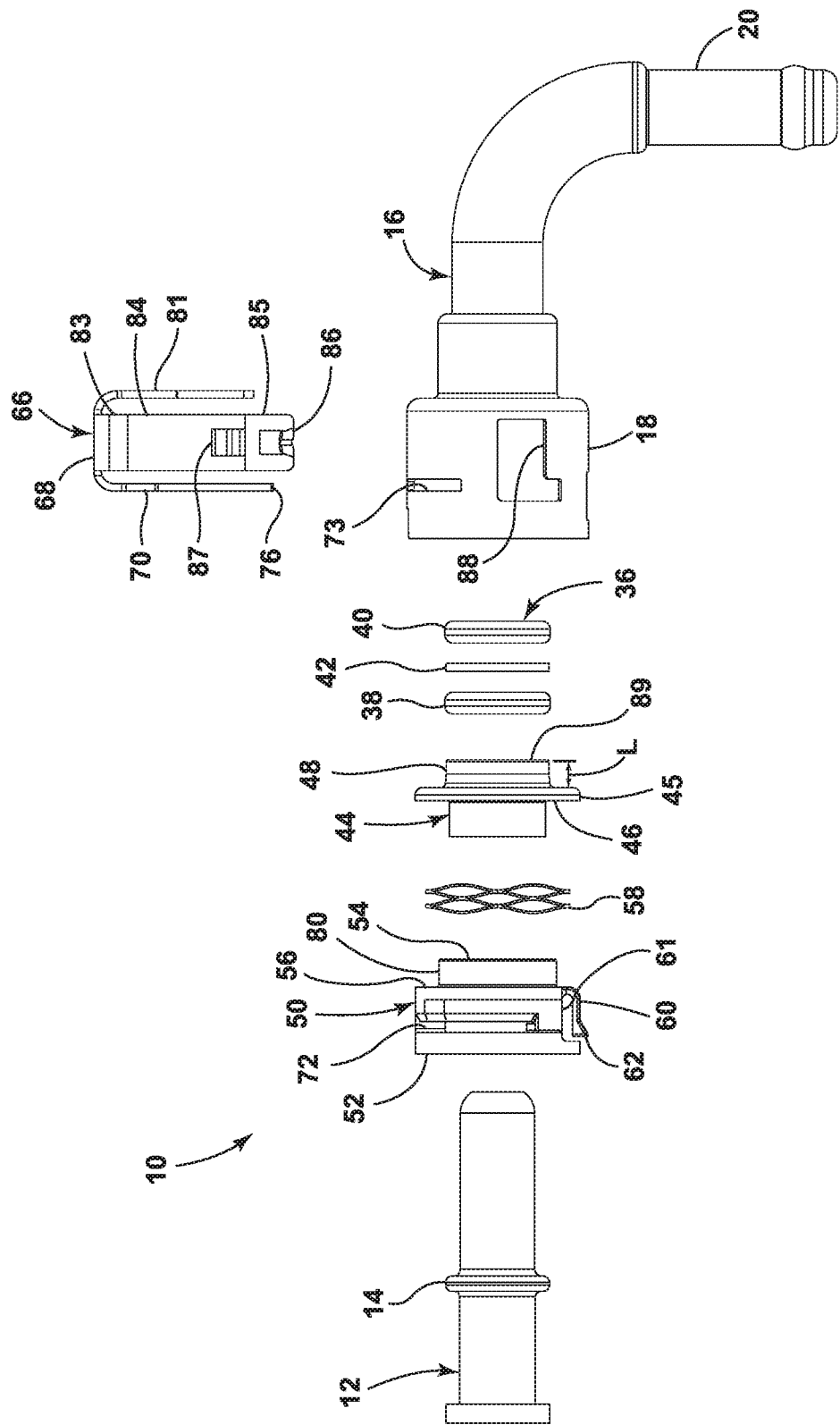
FIG. 3 shows an exploded view of the QC assembly of FIG. 1.

As shown in FIGS. 1 and 6, each of the outside legs 83 of the locker 66 also includes at least one notch defining a tab 87 which extends radially inwardly from its first arc-shaped section 84. The notch may be formed by cutting small slits in the locker 66 and bending the material of the locker at the slit to present the tab 87. This is a quick process which adds very little cost or labor to the fabrication of the locker 66. As best shown in FIG. 3, the housing 16 presents two windows 88 for receiving and engaging the tabs 87 of the locker 66 when the locker is in the locked position with the first arc-shaped sections 84 of the outside legs 83 engaging the housing 16. The connection of the tabs 87 of the locker 66 with the windows 88 of the housing 16 prevents the locker 66 from being moved out of the engaged position with only an upward force being applied on the locker. Rather, outside legs 83 must be pulled apart to disengage the tab 87 from the window 88 before the locker 66 can be moved out of the locked position. This safety mechanism provides further protection to ensure that the locker 66 does not accidentally move out of the locked position. It should be appreciated that the tabs 87 could alternately be formed on the housing 16 and the windows 88 could be formed on the outside legs 83.

As best shown in FIG. 1, when the locker 66 is in the locked position, the base 68 is raised relative to the top of the housing 16, and the outside legs 83 extend downwardly from either side of the base 68. The flared sections 86 of the outside legs 83 of the locker 66 can be pulled outwardly and upwardly to move the locker 66 from the locked position to the unlocked position. Thus, only a deliberate action by the user can move the locker 66 into the unlocked position. This is still another safety feature of the quick connector assembly 10.

Figures 4A, 4B:
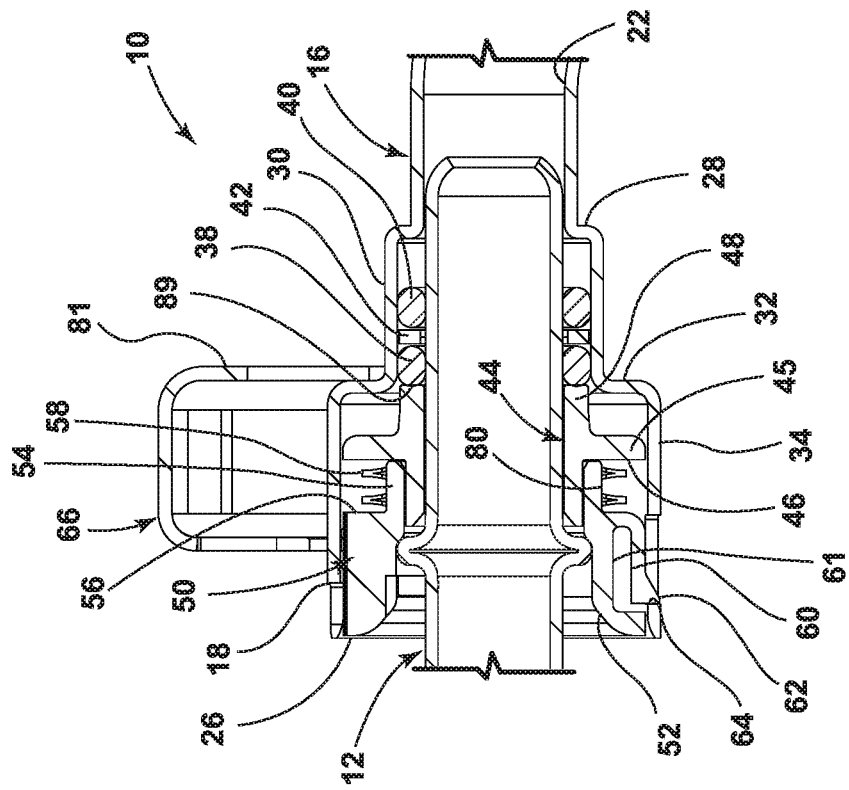
FIG. 4A shows a partial side cross-sectional view of a female receiving portion of the QC assembly in a locked position.
FIG. 4B shows a partial side cross-sectional view of the female receiving portion of the QC assembly in an unlocked position, under pressurization conditions.

As best shown in FIGS. 2 and 4A, when the locker 66 is in the locked position, the base 68 is raised relative to the housing 16, the inside legs 70 extend downwardly from one side of the base, the rear legs 81 extend downwardly from an opposite side of the base, and the outside legs 83 extend from the other two sides of the base intermediate the sides from which the inside and rear legs extend. To move the locker 66 upwardly to the unlocked position, the flared sections 86 of the outside legs 83 of the locker can be pulled apart to separate the tabs 87 from the windows 88 and the locker can be pushed upwardly without the need for a tool to move the locker from the locked position to the unlocked position. In the unlocked position, the flared sections 86 of the second arc-shaped section 85 engage the windows 88 (in much the same manner as the tabs 87 engage the windows in the locked position) to prevent the locker 66 from being removed from the housing 16.

In operation, the quick connector assembly 10 starts with the locker 66 in the unlocked position and the plunger 50 in the resting position. As discussed above, in this position, the plunger 50 is biased forwardly by the resilient member 58 against the lower sections 76 of the inside legs 70 of the locker 66. This contact between the inside legs 70 and the plunger 50 prevents the locker 66 from moving downwardly to the locked position and prevents the plunger from escaping the housing 16. The male end form 12 is then urged in an axial direction into the inner bore 22 of the housing 16 through the receiving inlet orifice 26, and the front of the male end form is sealed to the housing through the sealing rings 38, 40 to prevent fluid from escaping the quick connector assembly 10. Once the male end form 12 has been inserted far enough into the inner bore 22, the bead 14 of the male end form 12 will engage the plunger 50. Further insertion of the male end form 12 will overcome the biasing force from the resilient member 58 to move the plunger 50 backwardly. Once the bead 14 clears the inside legs 70, the locker 66 can be urged downwardly into the locked position to trap the bead of the male end form 12 between the plunger 50 and the upper sections 74 of the inside legs 70 of the locker 66. It should be noted that it is only after the male end form 12 has been inserted sufficiently far into the inner bore 22 of the housing 16 for the bead 14 to clear the inside legs 70 that the locker 66 can be moved into the locked position. This feature, when combined with the visible cue that the locker 66 has been successfully moved into the locked position ensures that the male end form 12 can only be properly locked and sealed with the quick connector assembly 10.

To remove the male end form 12 from the quick connector assembly 10 or to otherwise move the locker 66 from the locked position to the unlocked position, a user must first disengage the tabs 87 of the locker from the windows 88 of the housing 16 by pushing the outside legs 83 of the locker outwardly. Once the outside legs 83 are pushed outwardly, the locker 66 can be moved upwardly so that the inside legs 70 are moved in a direction out of the housing 16. Due to the flared sections 86 on the outside legs 83, the locker 66 cannot be completely removed from the housing 16 when it is moved to the unlocked position. In the unlocked position, the retaining ring 44 may float and move away from the first section of the inner bore 22 towards the inlet 26 of the female receiving portion 18. For example, during pressurized leak testing, when the locker 66 is in the unlocked position, pressure in the fluid passing through the fluid passageway formed by the quick connector assembly 10 can be substantial enough to force the seal pack 36 (particularly the first sealing ring 38) against the retaining ring 44. This force in turn causes the retaining ring 44 to move backward and to compress the resilient member 58, which also moves the plunger 50 backward until the limiter 60 engages the window 64. In this disposition, however, the length of the boss 48 of the retaining ring 44 is such that when the retaining ring is pushed as far back as the plunger will allow, the end 89 of the boss is positioned at least as far forward as the inlet to the first section 30 of the inner bore 22, essentially in line with the second shoulder 32 at the transition between the first and second sections 30, 34 of the inner bore. The boss 48 of the retaining ring 44 thereby prevents the first sealing ring 38 from slipping out of and being displaced from the first section 30 (seal bore area) of the inner bore 22.

The various elements of the components of the quick connector assembly 10 described above, e.g. the housing 16, the retaining ring 44, the plunger 50, and the locker 66, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the quick connector assembly 10 (e.g. t the housing 16, the retaining ring 44, the plunger 50, the locker 66, etc.) is monolithic in construction.

In general, materials suitable for use in or as the housing 16, the retaining ring 44, the plunger 50, and the locker 66 include metals (e.g. steels, aluminums, alloys, etc.), resins (e.g. thermoset and/or thermoplastic resins), rubbers/elastomers, and combinations thereof. However, myriad materials may be used to manufacture the elements of the quick connector assembly 10, each typically selected as a function of availability, cost, performance/end use applications, etc. Moreover, metals, metal alloys, rubbers/elastomers, and resins are not exhaustive of suitable materials that may be used. In general, the housing 16 and locker 66 comprise a metal, such as a steel.

In certain embodiments, the quick connector assembly 10 comprises a resin, such as a thermoplastic and/or thermoset resin. In such embodiments, the housing 16, the retaining ring 44, the plunger 50, and/or the locker 66 may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the quick connector assembly 10 comprise material suitable for use under continuous exposure to temperatures of from −40° C. to 120° C., or from −40° C. to 135° C. and/or pressures of from 0.5 to 2 bar. In certain embodiments, one or more, alternatively all, of the various components of the quick connector assembly 10 comprises materials that can withstand up to 30 minutes, alternatively more than 30 minutes, of exposure to temperatures of up to 150° C. without irreversible harmful effects (e.g. melting, etc.).

With regard to composition of the particular components of the quick connector assembly 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the particular components of the quick connector assembly 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the quick connector assembly 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the quick connector assembly 10 comprises a fiberglass.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A quick connector assembly for mating with a male end form, the assembly comprising:
a housing having an exterior surface and an inner bore for receiving the male end form, the inner bore including a first shoulder opening up to a first section having a first diameter and a second shoulder opening up to a second section having a second diameter larger than the first diameter;
a locker slidably engaging the exterior surface of the housing, the locker being movable between an unlocked position for allowing the male end form to be inserted into and withdrawn from the inner bore and a locked position for trapping the male end form in the inner bore;
a seal pack including a first sealing ring, a second sealing ring, and a spacer sandwiched between the first and second sealing rings, the seal pack being disposed in the first section of the inner bore; and
a floating retaining ring partially disposed within the second section of the inner bore;
the retaining ring including a radially extending seat and an elongated boss that extends axially from the seat and into the first section of the inner bore and abuts the first sealing ring for retaining the seal pack in the first section of the inner bore;
wherein in the unlocked position, the elongated boss of the retaining ring prevents the first sealing ring from being displaced out of the first section of the inner bore when the seal pack is deflected by fluid pressure in the quick connector assembly.

2. The quick connector assembly of claim 1, wherein the retaining ring is slidable along the inner bore.

3. The quick connector assembly of claim 1, including a plunger slidably disposed within the second section of the inner bore and a resilient member engaging the plunger and biasing the plunger in a first direction toward a resting position.

4. The quick connector assembly of claim 3, wherein the plunger includes a spring seat, and the resilient member is disposed between and engages the spring seat of the plunger and the seat of the retaining ring.

5. The quick connector assembly of claim 3, wherein the retaining ring floats between the plunger and the seal pack.

6. The quick connector assembly of claim 3, wherein the plunger includes an inner bore having diameter larger than an outer diameter of the retaining ring, and a portion of the retaining ring is received in the inner bore of the plunger.

7. The quick connector assembly of claim 3, wherein the locker is movable from the unlocked position to the locked position only in response to the male end form being inserted into the inner bore of the housing to slide the plunger away from the resting position.

8. The quick connector assembly of claim 3, wherein the resilient member is a wave spring.

9. The quick connector assembly of claim 3, wherein the plunger includes a limiter projecting from an outer surface of the plunger, the limiter terminating in a barbed end; and the housing including a window into which the barbed end of the limiter extends, wherein the barbed end contacts an edge of the window to restrict axial movement of the plunger in the inner bore.

10. The quick connector assembly of claim 1, wherein the seat of the retaining ring extends outwardly along the second shoulder of the inner bore.

11. The quick connector assembly of claim 1, wherein the boss has a length that is sufficient to prevent the seal pack from protruding out from the first section of the inner bore.

12. The quick connector assembly of claim 1, wherein the locker has a pair of outside legs slidably engaging the exterior surface of the housing.

13. The quick connector assembly of claim 12, wherein the exterior surface of the housing includes at least two windows, and the outside legs of the locker each include a tab for engaging the windows, wherein the locker is movable from the locked position to the unlocked position only in response to the outside legs being pulled away from one another to disengage the tabs from the windows.

14. The quick connector assembly of claim 1, wherein the housing is I-shaped, U-shaped, L-shaped, or T-shaped.

15. The quick connector assembly of claim 3, wherein: (i) the housing is monolithic in construction; (ii) the retaining ring is monolithic in construction; (iii) the plunger is monolithic in construction; or (iv) any of (i)-(iii).

16. A method of mating a male end form with a quick connector assembly, comprising:
providing the quick connector assembly of claim 1;
inserting the male end form into the inner bore of the housing;
moving the locker between the unlocked position to the locked position; and
in the unlocked position, preventing the first sealing ring from being displaced out of the first section of the inner bore.

17. The method of claim 16, wherein the quick connector assembly includes a plunger slidably disposed within the second section of the inner bore and a resilient member engaging the plunger and biasing the plunger in a first direction toward a resting position; and
inserting the male end form into the inner bore of the housing slides the plunger away from the resting position.

18. The method of claim 17, wherein the resilient member urges the retaining ring into engagement with the seal pack, and the boss of the retaining ring has a length that prevents the seal pack from being displaced from the first section of the inner bore.

* * * * *